(12) United States Patent
Kim et al.

(10) Patent No.: US 7,428,035 B2
(45) Date of Patent: Sep. 23, 2008

(54) LIQUID CRYSTAL DISPLAY DEVICE WITH HEATING CONDUCTIVE LINES FORMED SUBSTANTIALLY IN PARALLEL WITH GATE LINES AND DATA LINES

(75) Inventors: Young Sik Kim, Gyeongsangbuk-do (KR); Jeong Ki Kim, Daegu-si (KR); Sun Yong Lee, Gyeongsangbuk-do (KR); Sang Ky Jeon, Seoul (KR)

(73) Assignee: LG Display Co., Ltd., Seoul (KR)

( * ) Notice: Subject to any disclaimer, the term of this patent is extended or adjusted under 35 U.S.C. 154(b) by 418 days.

(21) Appl. No.: 11/159,207

(22) Filed: Jun. 23, 2005

(65) Prior Publication Data

US 2005/0285986 A1    Dec. 29, 2005

(30) Foreign Application Priority Data

Jun. 28, 2004    (KR) ...................... 10-2004-0048790

(51) Int. Cl.
G02F 1/1333 (2006.01)
G02F 1/1343 (2006.01)

(52) U.S. Cl. .......................... 349/161; 349/21; 349/111
(58) Field of Classification Search .................. 349/42, 349/161, 21, 111
See application file for complete search history.

(56) References Cited

U.S. PATENT DOCUMENTS

| | | | | |
|---|---|---|---|---|
| 3,450,856 A * | 6/1969 | Winkless et al. | ............ | 219/633 |
| 4,584,461 A * | 4/1986 | Teshima et al. | ............ | 219/209 |
| 4,775,221 A * | 10/1988 | Baumgartner, Jr. | .......... | 349/161 |
| 5,062,690 A * | 11/1991 | Whetten | ....................... | 349/55 |
| 5,299,038 A * | 3/1994 | Hamada et al. | ............. | 349/161 |
| 5,303,074 A * | 4/1994 | Salisbury | ...................... | 349/55 |
| 5,355,251 A * | 10/1994 | Parks | ......................... | 359/354 |
| 5,373,378 A * | 12/1994 | Takubo et al. | ................. | 349/33 |
| 5,446,568 A * | 8/1995 | Nakazawa et al. | ............ | 349/42 |
| 5,502,583 A * | 3/1996 | Sukegawa et al. | ............. | 349/42 |
| 5,559,614 A * | 9/1996 | Urbish et al. | ................. | 349/21 |
| 5,694,147 A * | 12/1997 | Gaalema et al. | ............. | 345/101 |
| 5,694,191 A * | 12/1997 | Strathman et al. | ........... | 349/161 |
| 6,014,191 A * | 1/2000 | Kim et al. | ...................... | 349/54 |
| 6,128,053 A * | 10/2000 | Brandt et al. | ................. | 349/72 |
| 6,133,979 A * | 10/2000 | Komatsu et al. | ............. | 349/161 |
| 6,717,634 B2 * | 4/2004 | Kim et al. | ..................... | 349/54 |
| 2005/0214956 A1 * | 9/2005 | Li et al. | ........................ | 438/14 |

\* cited by examiner

Primary Examiner—Andrew Schechter
Assistant Examiner—Paisley L Arendt
(74) Attorney, Agent, or Firm—Morgan, Lewis & Bockius LLP

(57) ABSTRACT

A liquid crystal display device is disclosed. The disclosed device includes a first substrate including a plurality of gate and data lines defining a plurality of pixel regions, heating conductive lines having first conductive lines formed substantially in parallel with the gate lines and second conductive lines formed substantially in parallel with the data lines, thin film transistors (TFT) connected to the corresponding gate lines and data lines, and pixel electrodes connected to the corresponding TFTs. The disclosed device also includes a second substrate including a plurality of color filters formed corresponding to the pixel regions, and a liquid crystal layer between the first substrate and the second substrate. At least one of the second conductive lines is separated from at least one of the first conductive lines.

15 Claims, 5 Drawing Sheets

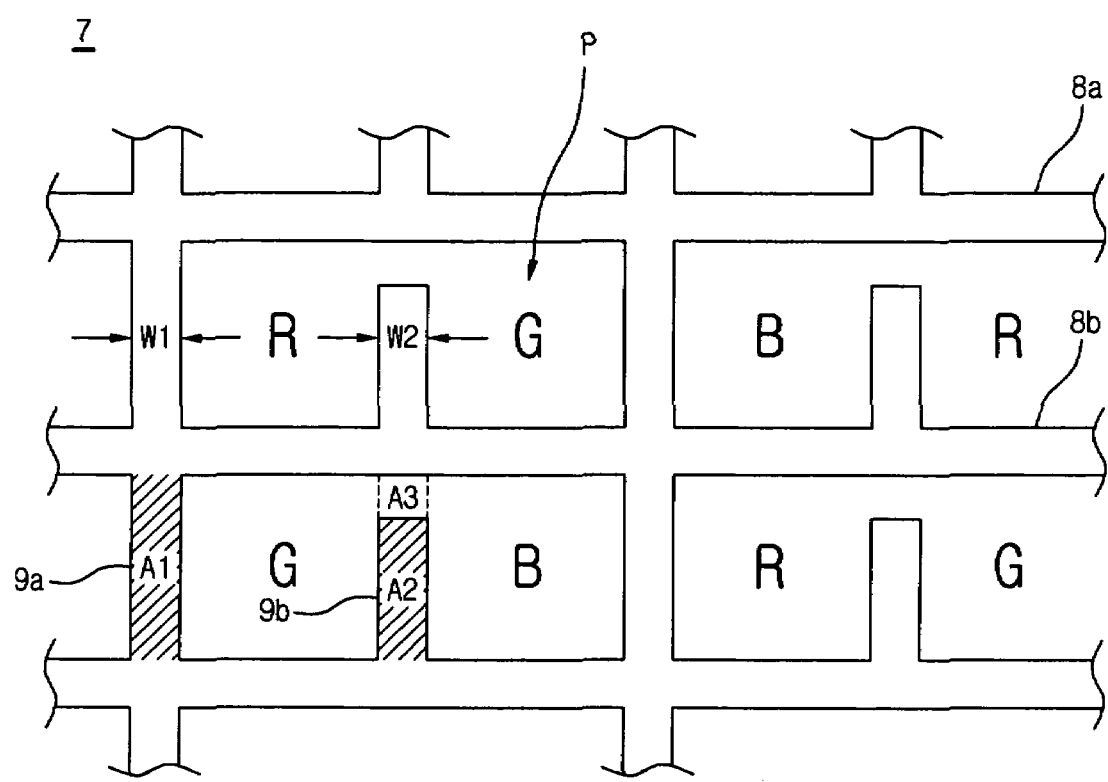

LIQUID CRYSTAL DISPLAY DEVICE WITH HEATING CONDUCTIVE LINES FORMED SUBSTANTIALLY IN PARALLEL WITH GATE LINES AND DATA LINES

This application claims the benefit of the Korean Patent Application No. 48790/2004 filed on Jun. 28, 2004, which is hereby incorporated by reference.

BACKGROUND OF THE INVENTION

1. Field of the Invention

The present invention relates to a liquid crystal display device, and more particularly, to a liquid crystal display device having a heating conductive line.

2. Description of the Related Art

Flat panel display devices have excellent visibility and low power consumption. Accordingly, the flat panel display devices are widely used in, among others, hand-held telephones, notebook computers, computer monitors, and television sets. Examples of the flat panel display devices include a plasma display panel (PDP), a field emission display (FED), and a liquid crystal display device (LCD).

An LCD includes two substrates having electrodes formed respectively thereon to generate an electric field, and a liquid crystal layer formed by injecting a liquid crystal material into a gap between the two substrates. A voltage is applied to the electrodes to generate an electric field, thereby controlling the orientation of the liquid crystal molecules to displaying an image.

A fast response by the liquid crystal molecules to the applied voltage is required for the LCD to be able to display a moving image. That is, the liquid crystal molecules must be twisted in response to the applied voltage. Due to the twist of the liquid crystal molecules, the light transmittance is changed and an image is accordingly displayed.

However, most liquid crystal materials are affected by temperature. Specifically, the response characteristic of the liquid crystal materials is degraded with a decrease in temperature. Accordingly, the display characteristics of the LCD are degraded at low temperatures.

When the LCD is provided with a heating unit for heating up cold liquid crystal, it can exhibit more consistent response characteristics.

FIG. 1 is a schematic view of an array substrate of a related art LCD. Generally, the LCD is constructed to include an array substrate having thin film transistors (TFTs) arranged thereon in a matrix pattern, a color filter substrate having RGB color filters arranged thereon, and a liquid crystal layer interposed between the two substrates. Common electrodes for supplying a common voltage may be formed on the color filters.

As shown in FIG. 1, on the array substrate of the related art LCD, a plurality of gate lines 1 extending in a first direction intersect a plurality of data lines 2 extending in a second direction perpendicular to the first direction. A pixel region P is defined by the intersection of a corresponding gate line 1 and data line 2. Also, a TFT (not shown) serving as a switch is connected to the corresponding gate line 1 and data line 2. That is, a gate electrode of the TFT is connected to the gate line 1, and a source electrode thereof is connected to the data line 2. A pixel electrode (not shown) is connected to a drain electrode of the TFT. Accordingly, the pixel electrode is formed in the pixel region P defined by the intersection of the corresponding gate line 1 and data line 2.

A color filter corresponding to the pixel electrode is arranged on a color filter substrate (not shown). That is, RGB color filters are alternately arranged on the color filter substrate in such a way to correspond to the respective pixel electrodes formed on the array substrate. For example, the color filters are arrange in the order of R, G, and B color filters, and first, second, and third pixel electrodes corresponding respectively to the R, G, and B color filters are formed on the array substrate. Accordingly, the light having passed through the pixel electrodes passes through each corresponding color filter, which causes a specific color to be displayed.

Meanwhile, heating conductive lines 3 for controlling the temperature of the liquid crystal are placed around each pixel region P. That is, the heating conductive lines 3 include first conductive lines 4 arranged in close vicinity to and in parallel with the gate lines 1, and a second conductive lines 5 arranged in close vicinity to and in parallel with the data lines 2. The first and second conductive lines 4 and 5 are connected at their intersections. Accordingly, the heating conductive lines 3 are arranged in a mesh pattern.

As illustrated in FIG. 1, the heating conductive lines 3 are arranged around the periphery of the pixel regions P. Here, each pixel region (that is, an R, G or B pixel region) is called a "dot." Also, the heating conductive lines 3 may be formed of metal material that generates heat when a voltage is applied thereto.

When the related art LCD shown in FIG. 1 is operated at a low ambient temperature, a voltage is applied to the heating conductive lines 3. The applied voltage causes the heating conductive lines 3 to generate heat, thereby raising the temperature of the liquid crystal material in the liquid crystal layer. Accordingly, a response time of the liquid crystal molecules becomes faster and thus a gray scale for each frame is more accurately reproduced. Consequently, an image quality is not degraded even at a low ambient temperature.

However, when the heating conductive lined 3 are arranged around the periphery of the each pixel region P as shown in FIG. 1, it is difficult to have a resistance high enough to generate sufficient heat. That is, when the heating conductive lines 3 are arranged in a mesh pattern on a dot basis, as illustrated in FIG. 1, parallel resistances as many as the number of the dots are created. Consequently, the total resistance, that is, the resultant resistance of the parallel resistances decreases. When the total resistance decreases, the amount of generated heat decreases as much as the square of the amount of reduction in the total resistance. Accordingly, when the heating conductive line is arranged in the above manner, it is difficult to raise the temperature of the liquid crystal rapidly. Thus, it is difficult to improve the response characteristics of the liquid crystal.

One possible way to solve this problem is to increase the length of the heating conductive line so as to generate more heat. FIG. 2 is a schematic view of an array substrate of another related art LCD. In FIG. 2, the gate lines 1 and data lines 2 are arranged in the same manner as those in FIG. 1. The array substrate also includes a heating conductive line having first conductive lines 4 and second conductive lines 5. However, while the heating conductive lines 3 shown in FIG. 1 are arranged around each pixel region P, heating conductive lines 3 shown in FIG. 2 are placed around each combination of three pixel regions, i.e., a combination of R, G, and B pixel regions. That is, the heating conductive lines 3 in FIG. 2 are placed around three dots. Here, the three dots are called a "pixel". When the heating conductive lines 3 are arranged on a pixel basis, instead of on a dot basis, the number of second conductive lines 5 is reduced to one third, and the total resistance, i.e., the resultant parallel resistance of the heating conductive lines 3, is accordingly increased. Thus, the amount of heat generated by the heating conductive lines 3 increases as much as the square of the amount of increase in the total resistance. The increased amount of heat results in a more rapid increase in the temperature of the liquid crystal. Consequently, the response time of the liquid crystal at a low ambient temperature becomes faster, and an image of a more uniform quality is displayed.

However, when the heating conductive lines 3 are arranged on a pixel basis, i.e., on a three-dot basis, the parasitic capacitances of the respective dots become different from one another. For example, in FIG. 2, a second conductive line 5 is placed at the left side of an R pixel region, and another second conductive line 5 is placed at the right side of a B pixel region. No second conductive line 5 is placed between the R pixel region and the adjacent G pixel region or between the G pixel region and the adjacent B pixel region. Accordingly, the parasitic capacitances created between the second conductive line 5 placed at the left side of the R pixel region, and the R pixel region, the G pixel region, and the B pixel region, respectively, become different from one another. Similarly, parasitic capacitances created between the second conductive line 5 placed at the right side of the R pixel region, and the B pixel region, the G pixel region, and the R pixel region, respectively, become different from one another. That is, a higher parasitic capacitance is induced in the pixel region near the second conductive lines 5. This difference in the parasitic capacitance causes a difference in the brightness of the respective pixel regions, resulting in spots in the displayed image. These spots greatly degrade the image quality.

SUMMARY OF THE INVENTION

Accordingly, the present invention is directed to a liquid crystal display device that substantially obviates one or more problems due to limitations and disadvantages of the related art.

An object of the present invention is to provide an LCD capable of preventing a possible image spot and improving response characteristics of the liquid crystal when driven at low temperatures.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other objects of the invention, a liquid crystal display device includes: a first substrate including a plurality of gate and data lines defining a plurality of pixel regions, heating conductive lines having first conductive lines formed substantially in parallel with the gate lines and second conductive lines formed substantially in parallel with the data lines, thin film transistors (TFT) connected to the corresponding gate lines and data lines, and pixel electrodes connected to the corresponding TFTs; a second substrate including a plurality of color filters formed corresponding to the pixel regions; and a liquid crystal layer between the first substrate and the second substrate, wherein at least one of the second conductive lines is separated from at least one of the first conductive lines.

In another aspect of the present invention, a liquid crystal display device includes: a first substrate including a plurality of gate and data lines defining a plurality of pixel regions, heating conductive lines having first conductive lines formed substantially in parallel with the gate lines and second conductive lines formed substantially in parallel with the data lines, thin film transistors (TFTs) connected to the corresponding gate lines and the data lines, and pixel electrodes connected to the corresponding TFTs; a second substrate including a plurality of color filters formed corresponding to the pixel regions; and a liquid crystal layer between the first substrate and the second substrate, wherein the second conductive lines include a line having a first width and a line having a second width different from the first width.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate exemplary embodiments of the invention and together with the description serve to explain the principle of the invention. In the drawings:

FIG. 5 is a schematic view of an array substrate of an LCD according to the third exemplary embodiment of the present invention.

DETAILED DESCRIPTION OF PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
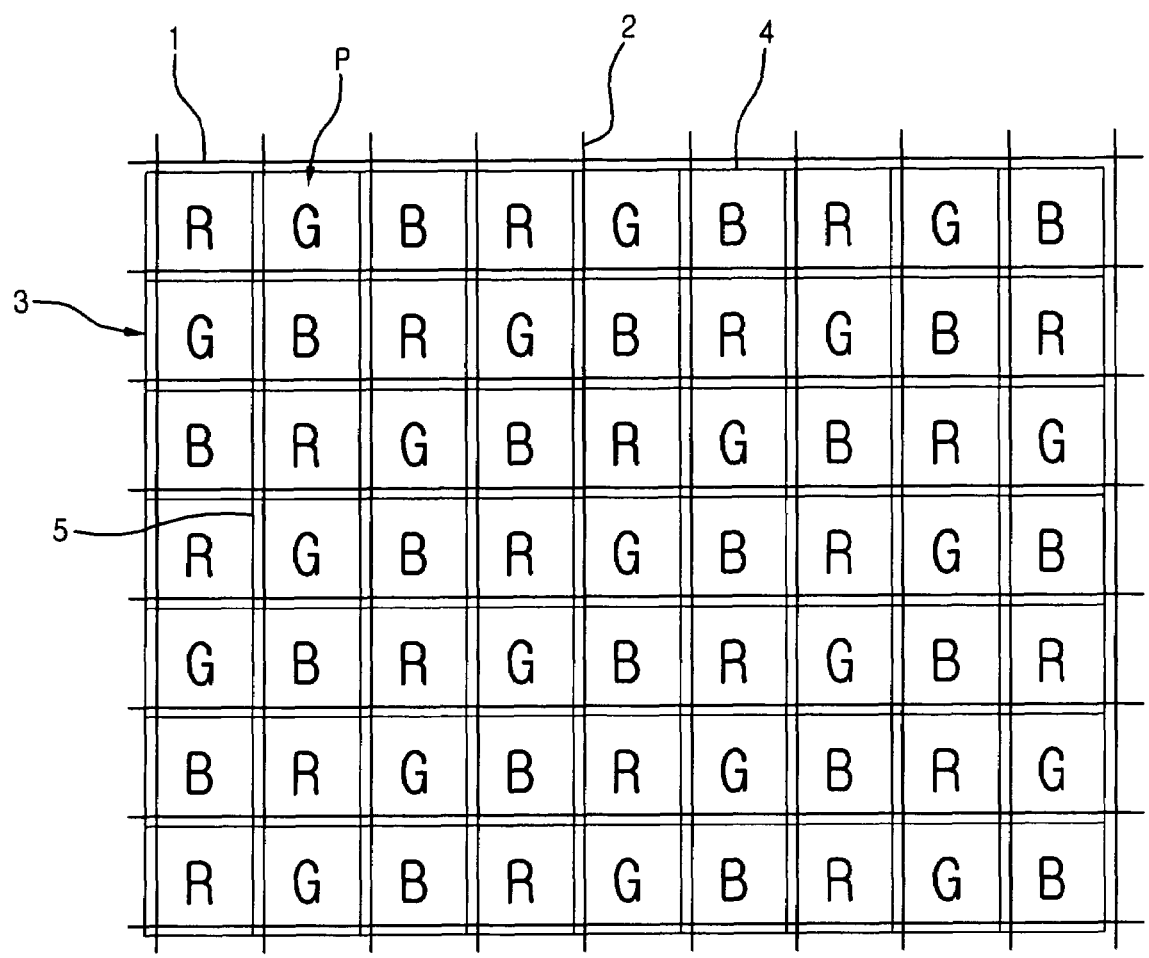
FIG. 1 is a schematic view of an array substrate of a related art LCD.
Figure 2:
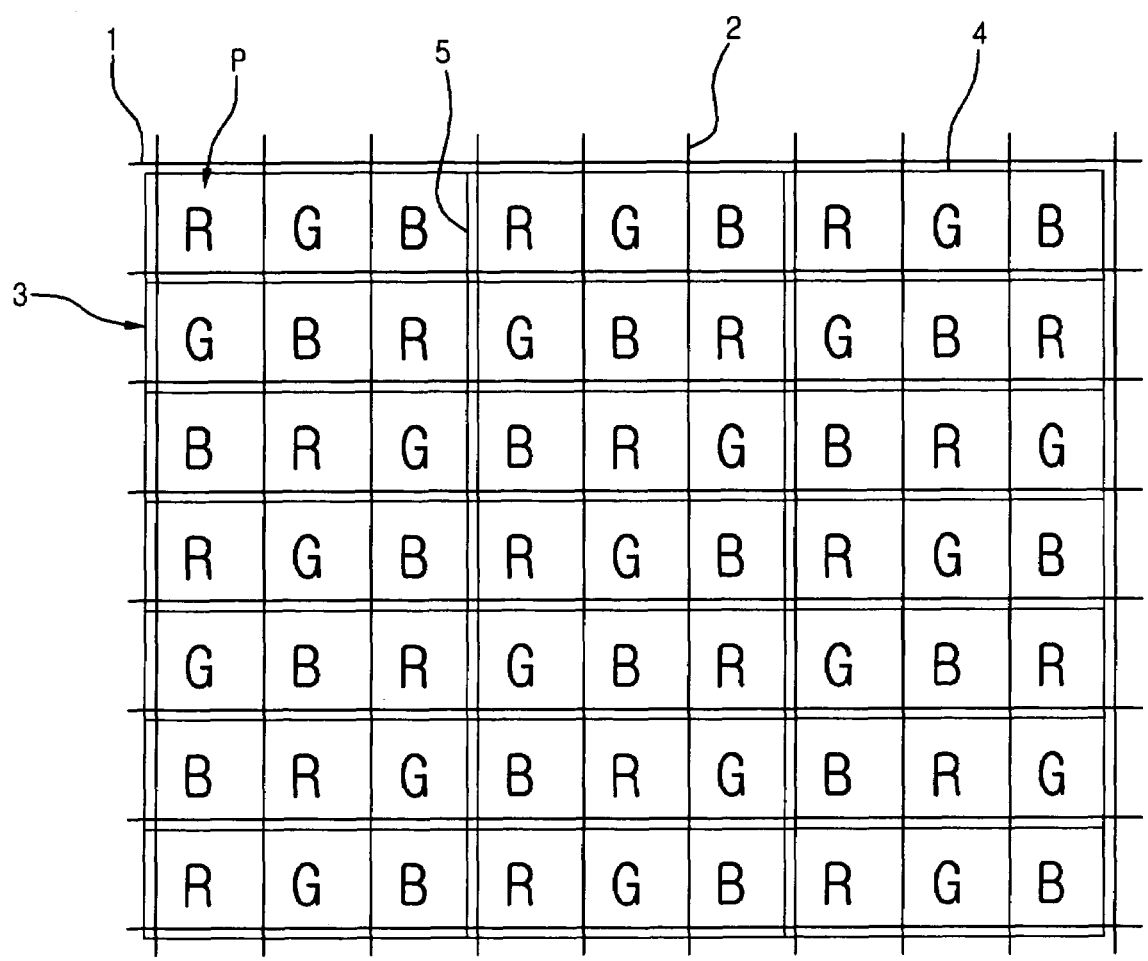
FIG. 2 is a schematic view of an array substrate of another related art LCD.
Figure 3:
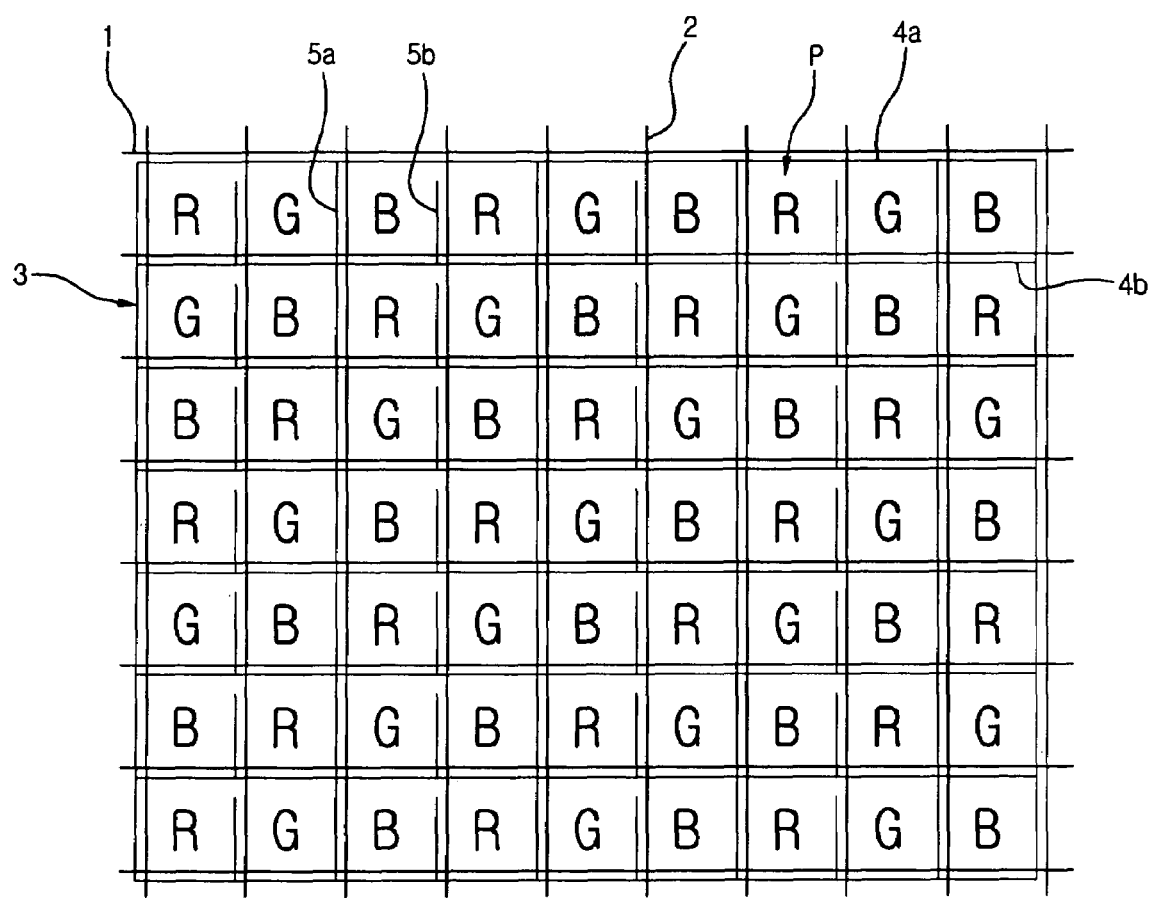
FIG. 3 is a schematic view of an array substrate of an LCD according to the first exemplary embodiment of the present invention.

FIG. 3 is a schematic view of an array substrate of an LCD according to an embodiment of the present invention. Generally, an LCD is constructed to include an array substrate having thin film transistors (TFTs) arranged thereon in a matrix pattern, a color filter substrate having RGB color filters arranged thereon, and a liquid crystal layer interposed between the two substrates. Common electrodes for supplying a common voltage may be formed on the color filters.

As illustrated in FIG. 3, the array substrate of the LCD according to the first exemplary embodiment of the present invention includes a plurality of gate lines 1 extending in a first direction and intersecting a plurality of data lines 2 extending in a second direction perpendicular to the first direction. A pixel region P is defined by the intersection of the corresponding gate line 1 and data line 2. Also, a TFT (not shown) serving as a switch is connected to the corresponding gate line 1 and data line 2. That is, a gate electrode of the TFT is connected to the corresponding gate line 1, and a source electrode thereof is connected to the corresponding data line 2. A pixel electrode (not shown) is connected to a drain electrode of the TFT. Accordingly, the pixel electrode is formed in the pixel region P defined by the corresponding gate line 1 and data line 2.

A color filter corresponding to the pixel electrode is arranged on a color filter substrate (not shown). That is, R, G, and B color filters are alternately arranged on the color filter substrate in such a way to correspond to the respective pixel electrodes formed on the array substrate. For example, the color filters are arrange in the order of R, G, and B color filters, and first, second, and third pixel electrodes corresponding respectively to the R, G, and B color filters are formed on the array substrate. Accordingly, the light having passed through the pixel electrodes passes through each corresponding color filter, which causes a specific color to be displayed.

Meanwhile, heating conductive lines 3 for controlling the temperature of the liquid crystal is arranged around each pixel region P. Here, the heating conductive lines 3 may be formed of metal material that generates heat when a voltage is applied thereto. The heating conductive lines 3, as shown in FIG. 3, include first conductive lines 4a and 4b placed in close vicinity to and in parallel with the gate lines 1, and second conductive lines 5a and 5b placed in close vicinity to and in parallel with the data lines 2. The first conductive lines 4a, 4b, and second conductive lines 5a, 5b are connected to each other at their intersections. Accordingly, the heating conductive lines 3 are arranged in a modified mesh pattern. However, in the first exemplary embodiment of the present invention, the second conductive lines 5b are disconnected or separated from the first conductive lines 4a and are connected to the first conductive lines 4b. The second conductive lines 5a are connected to both the first conductive lines 4a and 4b. That is, the second conductive lines 5a, 5b between a plurality of sequentially arranged pixel regions P may be disconnected or separated from and connected to the first conductive lines 4a in alternating pixel regions 2.

For example, the second conductive line 5b between a first R pixel region and a first G pixel region is disconnected or separated from the first conductive line 4a, and the second conductive line 5a between the first G pixel region and a first B pixel region is connected to the first conductive line 4a. Likewise, the second conductive line 5b between the first B pixel region and a second R pixel region is disconnected or separated from the first conductive line 4a, and the second conductive line 5a between the second R pixel region and a second G pixel region is connected to the first conductive line 4a. In this manner, the arrangement of the second conductive lines 5a, 5b is repeated in the following pixel regions.

One end portion of the disconnected or separated second conductive lines 5b is connected to the first conductive line 4b. Also, the connected second conductive lines 5a are connected respectively to the upper and lower first conductive lines 4a and 4b.

As described above, in the first exemplary embodiment of the present invention as shown in FIG. 3, the heating conductive lines 3 are arranged around the respective pixel regions P and are disconnected and connected in turn between the alternating pixel regions P.

Since the heating conductive lines 3, as shown in FIG. 3, are arranged in a modified mesh pattern around each pixel region, i.e., on a dot basis, the parasitic capacitances between the heating conductive lines 3 and the respective pixel regions P become nearly identical to one another. Accordingly, an image spot due to the different parasitic capacitances in the related art LCD can be substantially prevented, and thus the image quality can be improved.

Also, since a current does not flow through the disconnected or separated second conductive lines 5b, the heating conductive lines 3 are essentially arranged on a two-dot basis. Accordingly, the number of the heating conductive lines 3 with parallel capacitance is reduced, and the total resistance is accordingly increased. Consequently, a larger amount of heat can be generated. As more heat is transmitted to the liquid crystal operating at a low ambient temperature, the temperature of the liquid crystal increases more rapidly, resulting in substantially normal response characteristics of the liquid crystal even at a low ambient temperature. Consequently, the LCD can display an image of a more consistent quality regardless of the ambient temperature.

Figure 4:
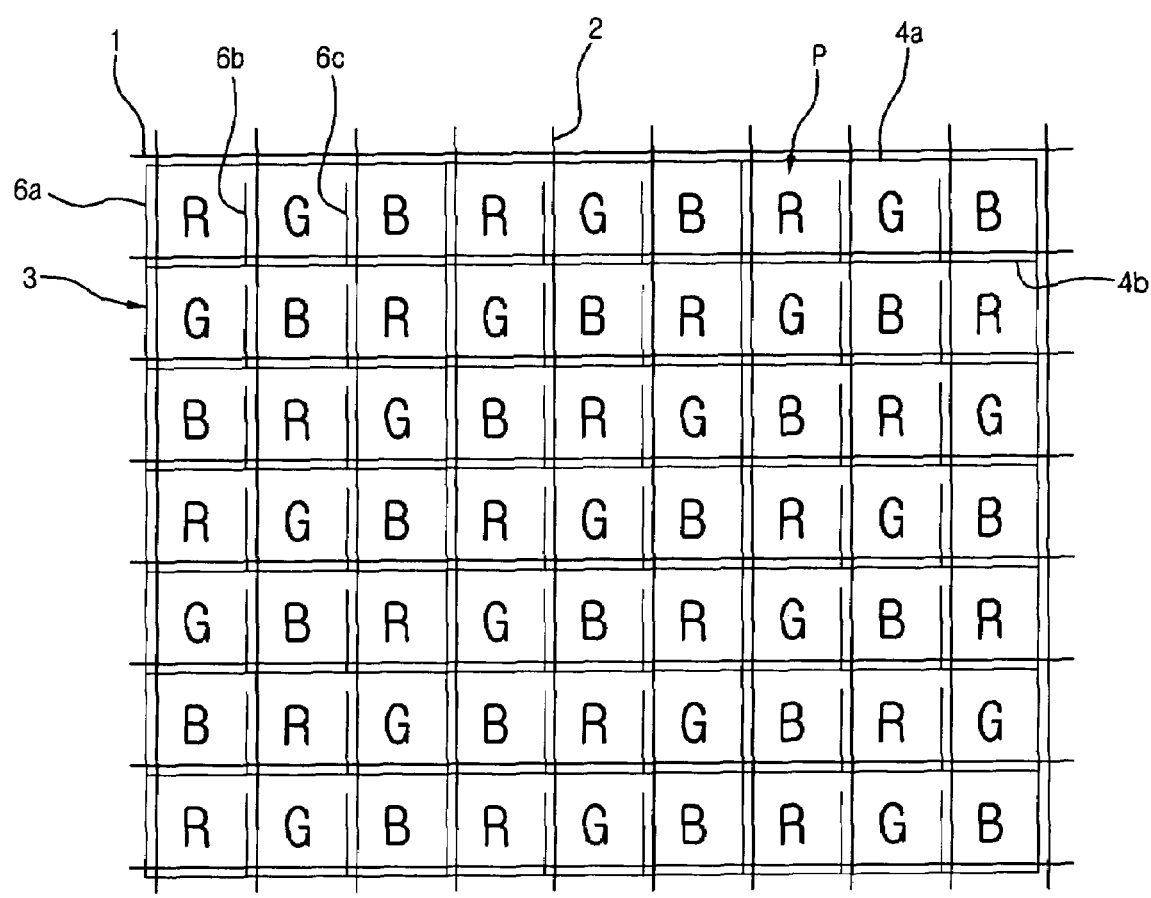
FIG. 4 is a schematic view of an array substrate of an LCD according to the second exemplary embodiment of the present invention.

FIG. 4 is a schematic view of an array substrate of an LCD according to the second exemplary embodiment of the present invention. As shown in FIG. 4, the gate lines 1 and data lines 2 are arranged in the same manner as those in the first exemplary embodiment illustrated in FIG. 3. However, while the heating conductive lines 3 of the first exemplary embodiment, shown in FIG. 3, are disconnected and connected in turn between the sequentially arranged pixel regions P, heating conductive lines 3 of the second exemplary embodiment, shown in FIG. 4, are disconnected or separated in two successive pixel regions P and are connected in the next pixel region P.

As illustrated FIG. 4, in the array substrate according to the second exemplary embodiment of the present invention, the heating conductive lines 3 for controlling the temperature of the liquid crystal are arranged around each pixel region P. Here, the heating conductive lines 3 may be formed of metal material that generates heat when a voltage is applied t hereto. That is, the heating conductive lines 3 include first conductive lines 4a and 4b arranged in close vicinity to and in parallel with the gate lines 1, and second conductive lines 6a, 6b and 6c arranged in close vicinity to and in parallel with the data lines 2. The first and second conductive lines 4a, 4b, 6a, 6b, 6c are connected at their intersections as illustrated in FIG. 4. Accordingly, the heating conductive lines 3 are arranged in a modified mesh pattern. Here, the second conductive lines 6b and 6c are disconnected or separated to the first conductive lines 4a in two successive pixel regions P, and the second conductive lines 6a are connected to the first conductive lines 4a in the next pixel region P.

For example, the second conductive lines 6b, 6c between a first R pixel region and a first G pixel region and between the first G pixel region and a first B pixel region are disconnected or separated from the first conductive line 4a, and the second conductive line 6a between the first B pixel region and a second R pixel region is connected to the first conductive line 4a. Likewise, the second conductive lines 6b, 6c between the second R pixel region and a second G pixel region and between the second G pixel region and a second B pixel region are disconnected or separated from the first conductive line 4a, and the second conductive line 6a between the second B pixel region and a third R pixel region is connected to the first conductive line 4a. In this manner, the arrangement of the second conductive lines 6a, 6b, and 6c is repeated in the following pixel regions.

One end portion of the disconnected or separated second conductive lines 6b and 6c is connected to the first conductive lines 4b. Also, the connected second conductive lines 6a are connected respectively to the upper and lower first conductive lines 4a and 4b.

Since the heating conductive lines 3 are arranged in a modified mesh pattern on a dot basis, the parasitic capacitances between the heating conductive lines 3 and the respective pixel regions P become nearly identical to one another.

Accordingly, an image spot due to the different parasitic capacitances in the related art LCD is substantially prevented, and thus, an image quality can be improved.

Also, since a current does not flow through the disconnected or separated second conductive lines 6b and 6c, the heating conductive lines 3 are essentially arranged on a three-dot basis. Accordingly, the number of the heating conductive lines 3 with parallel resistance in FIG. 4 is even more reduced than that in FIG. 3, resulting in a further increase in the total resistance of the heating conductive lines 3. Consequently, a larger amount of heat can be generated and transmitted to the liquid crystal operating at a low ambient temperature. Thus, the temperature of the liquid crystal is increased more rapidly, resulting in substantially normal response characteristics of the liquid crystal even at a low ambient temperature. Consequently, the LCD can display an image of a more consistent quality regardless of the ambient temperature.

As described above, the heating conductive lines 3 shown in FIGS. 3 and 4 can generate more heat than the related art heating conductive lines 3 to prevent undesirable image spots. Alternatively, although not illustrated in the drawings, heating conductive lines that are disconnected or separated in four or more successive pixel regions can be employed to further increase the total resistance of the heating conductive lines, thereby generating even more heat and/or requiring a lower voltage and raising the temperature of the liquid crystal operating in a low ambient temperature more rapidly.

In the first and second exemplary embodiments of the present invention shown in FIGS. 3 and 4, there exists a small difference in the parasitic capacitances between the heating conductive lines 3 and the respective pixel regions due to some second conductive lines being disconnected or separated from and the other second conductive lines being connected to the first conductive lines 4a. This makes it difficult to completely prevent image spots. Also, the difference in the parasitic capacitances may potentially induce a color coordinate shift. These problems can be solved by optimizing the heating conductive lines shown in FIGS. 3 and 4.

FIG. 5 is a schematic view of an array substrate of an LCD according to the third exemplary embodiment of the present invention. As shown in FIG. 5, heating conductive lines 7 for controlling the temperature of the liquid crystal are arranged around each of the pixel regions, i.e., the RGB pixel regions. Here, the heating conductive lines 7 may be formed of metal material that generates heat when a voltage is applied thereto. The heating conductive lines 7 include first conductive lines 8a and 8b arranged in close vicinity to and in parallel with gate lines (not shown), and second conductive lines 9a and 9b arranged in close vicinity to and in parallel with data lines (not shown). The first and second conductive lines 8a, 8b, 9a, 9b are connected at their intersections. Accordingly, the heating conductive lines 7 are arranged in a modified mesh pattern. Here, the second conductive lines 9b and 9a between a plurality of sequentially-arranged pixel regions P are disconnected and connected in turn to the first conductive line 8a.

For example, the second conductive line 9b between a first R pixel region and a first G pixel region is disconnected or separated from the first conductive line 8a, and the second conductive line 9a between the first G pixel region and a first B pixel region is connected to the first conductive line 8a. Likewise, the second conductive line between the first B pixel region and a second R pixel region is disconnected or separated from the first conductive line 8a, and the second conductive line 9a between the second R pixel region and a second G pixel region is connected to the first conductive line 8a. In this manner, the arrangement of the second conductive lines 9a and 9b is repeated in the following pixel regions.

One end portion of the disconnected or separated second conductive lines 9b is connected to the first conductive line 8b. Also, the connected second conductive lines 9a are connected respectively to the upper and lower first conductive lines 8a and 8b.

In FIG. 3, the second conductive lines 5a and 5b between a plurality of sequentially arranged pixel regions P are also disconnected or separated from and connected to the first conductive line 4a in alternating pixel regions P. However, since the disconnected or separated second conductive lines 5b have the same width as the connected second conductive lines 5b, a small difference in parasitic capacitances among respective pixel regions is created because some of the second conductive lines, i.e., 5b, are disconnected from and the other second conductive lines, i.e., 5a, are connected to the first conductive lines 4a. This makes it difficult to completely prevent image spots.

In contrast, the disconnected or separated second conductive lines 9b shown in FIG. 5 are suitably adjusted to have a different width than the connected second conductive lines 9a so that almost no difference in parasitic capacitance among the respective pixel regions is created because of some of the second conductive lines being disconnected and the other second conductive lines being connected to first conductive lines 8a. Hence, it becomes possible to prevent undesirable image spots nearly completely.

As illustrated in FIG. 5, the disconnected or separated second conductive lines 9b are formed to have a width W2 larger than a width W1 of the connected second conductive lines 9a so that an area A2 of the lines 9b becomes substantially identical to an area A1 of the lines 9a. That is, the lines 9b are formed to have the width W2 larger than the width W1 of the line 9a to compensate for an area A3 of their disconnected portion. Accordingly, nearly no difference in parasitic capacitance among respective pixel regions is created due to the lines 9b being disconnected and the lines 9a being connected to the line 8a. Hence, it becomes possible to prevent image spots nearly completely and to improve the quality of the displayed image further.

The use of varying widths for conductive lines in the third exemplary embodiment may also be similarly applied to the exemplary heating conductive lines 3 shown in FIG. 4. That is, in FIG. 4, the disconnected second conductive lines 6b and 6c may be formed to have a larger width than the connected second conductive lines 6a such that the lines 6b and 6c have the same area as the line 6a. The line 6b can be formed to have the same width as the line 6c. Similarly, in other exemplary heating conductive line arrangements discussed above, in which four or more successive second conductive lines are disconnected or separated from a first conductive line, the disconnected second conductive lines may be formed to have a larger width than the connected second conductive line(s) such that the disconnected and connected second conductive lines have the same area. The disconnected conductive lines can be formed to have the same width.

As described above, the present invention can substantially prevent image spots and thus improve the quality of the image displayed on the LCD by forming the heating conductive lines to be disconnected and connected in turn between the sequentially-arranged pixel regions.

Also, the present invention can more completely prevent image spots and further improve the quality of the imaged displayed on the LCD by forming the disconnected or separated conductive lines to have the same area as the connected conductive lines.

It will be apparent to those skilled in the art that various modifications and variations can be made in the liquid crystal display device according to the present invention without departing from the spirit or scope of the invention. Thus, it is intended that the present invention cover the modifications and variations of this invention provided they come within the scope of the appended claims and their equivalents.

What is claimed is:

1. A liquid crystal display device comprising:
a first substrate including a plurality of gate and data lines defining a plurality of pixel regions, heating conductive lines having first conductive lines formed substantially in parallel with the gate lines and second conductive lines formed substantially in parallel with the data lines, thin film transistors (TFT) connected to the corresponding gate lines and data lines, and pixel electrodes connected to the corresponding TFTs;
a second substrate including a plurality of color filters formed corresponding to the pixel regions; and
a liquid crystal layer between the first substrate and the second substrate,
wherein at least one of the second conductive lines is separated from at least one of the first conductive lines,
wherein the second conductive line next to the separated second conductive line is connected to the first conductive line.

2. The liquid crystal display device according to claim 1, wherein the connected second conductive line is connected to at least two successive first conductive lines.

3. The liquid crystal display device according to claim 1, wherein one end of the separated second conductive line is connected to the next first conductive line.

4. The liquid crystal display device according to claim 1, wherein a corresponding one of the first conductive lines is placed in a close proximity to and substantially in parallel with each of the gate lines, and a corresponding one of the second conductive lines is placed in a close proximity to and substantially in parallel with each of the data lines.

5. The liquid crystal display device according to claim 1, wherein the first conductive lines are electrically connected to the second conductive lines.

6. The liquid crystal display device according to claim 5, wherein the first conductive lines and second conductive lines form a mesh like pattern.

7. A liquid crystal display device comprising:
a first substrate including a plurality of gate and data lines defining a plurality of pixel regions, heating conductive lines having first conductive lines formed substantially in parallel with the gate lines and second conductive lines formed substantially in parallel with the data lines, thin film transistors (TFTs) connected to the corresponding gate lines and the data lines, and pixel electrodes connected to the corresponding TFTs;
a second substrate including a plurality of color filters formed corresponding to the pixel regions; and
a liquid crystal layer between the first substrate and the second substrate,
wherein the second conductive lines include a line having a first width and a line having a second width different from the first width,
wherein the line having the first width is separated from at least one of the first conductive lines, and the line having the second width is connected to the first conductive line.

8. The liquid crystal display device according to claim 7, wherein one end of the line having the first width is connected to the next first conductive line.

9. The liquid crystal display device according to claim 7, wherein the line having the second width is also connected to the next first conductive line.

10. The liquid crystal display device according to claim 7, wherein the first width is larger than the second width.

11. The liquid crystal display device according to claim 7, wherein the line having the first width and the line having the second width have substantially the same area.

12. The liquid crystal display device according to claim 7, wherein the line having the first width is in one pixel region and the line having the second width is in the next pixel region.

13. The liquid crystal display device according to claim 7, wherein a corresponding one of the first conductive lines is placed in a close proximity to and substantially in parallel with each of the gate lines, and a corresponding one of the second conductive lines is placed in a close proximity to and substantially in parallel with each of the data lines.

14. The liquid crystal display device according to claim 7, wherein the first conductive lines are electrically connected to the second conductive lines.

15. The liquid crystal display device according to claim 14, wherein the first conductive lines and second conductive lines form a mesh like pattern.

* * * * *